(No Model.)
A. H. BOWMAN.
ARMATURE FOR DYNAMO ELECTRIC MACHINES.
No. 320,754. Patented June 23, 1885.
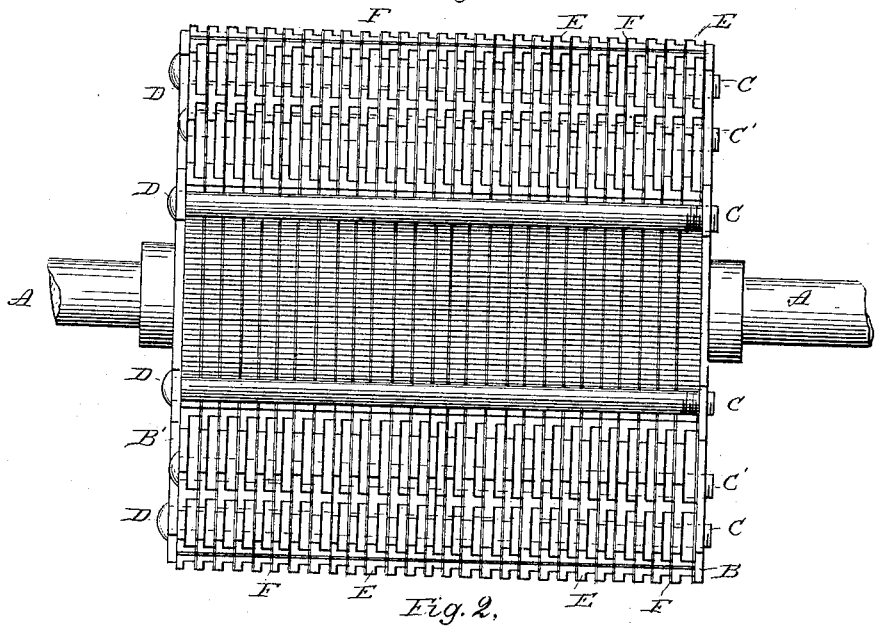
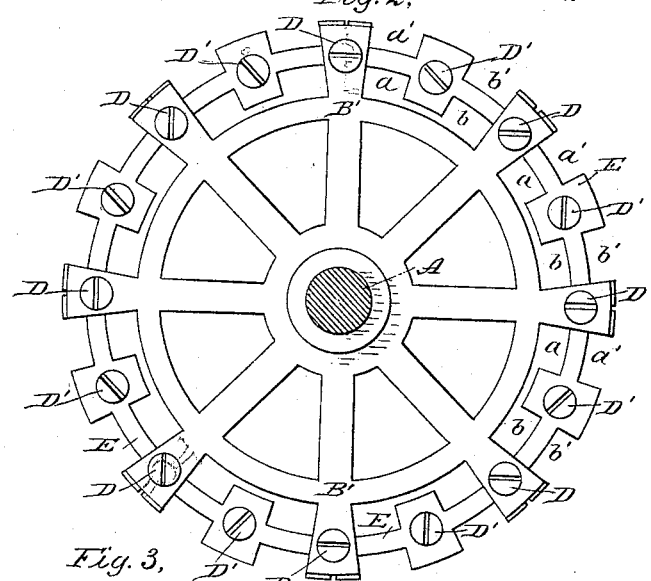
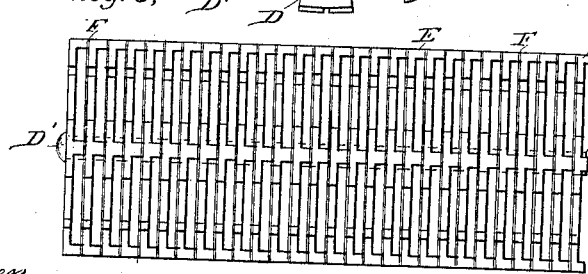
Witnesses:
Ernest Abshagen
Inventor:
A. H. Bowman
Atty: W. J. Johnston,
By Asso. Attorney: Edward P. Thompson

UNITED STATES PATENT OFFICE.

ALEXANDER H. BOWMAN, OF PACKERTON, PENNSYLVANIA.

ARMATURE FOR DYNAMO-ELECTRIC MACHINES.

SPECIFICATION forming part of Letters Patent No. 320,754, dated June 23, 1885.

Application filed April 4, 1885. (No model.)

*To all whom it may concern:*

Be it known that I, ALEXANDER H. BOWMAN, a citizen of the United States, and resident of Packerton, in the county of Carbon and State of Pennsylvania, have invented certain new and useful Improvements in an Armature for Dynamo-Machines, of which the following is a specification.

My invention relates to that class of armatures for dynamo-electric generators, known as the "Siemens type;" and it has for its object simplicity of construction in combination with efficiency as an armature.

It consists of links fastened together in sections, and of sections fastened together and to disks upon the shaft, the novelty consisting mostly in the disposition of the links and retaining-bolts.

In order that the invention may be clearly described the drawings annexed may be referred to by letters, as follows:

Figure 1 is a view of the armature at right angles to the shaft, one of the sections (shown in Fig. 3) being omitted. Fig. 2 is a view of the armature in the direction of the shaft, and Fig. 4 is a view of one of the links composing a section.

A is the shaft, upon which are two disks, B and B', fixed upon the shaft and connected by rods C, provided with heads D on one end, and on the other end with screw-threads which screw into female screws in the disk B. The heads are like those of an ordinary carpenter or machine screw—*i. e.*, they contain slots to receive a screw-driver. The links E are shaped as shown in Fig. 4, and are separated from actual contact by pieces of paper or other suitable insulating substance, F, of the same general shape as the links. As shown in Figs. 1 and 3, each link is provided with ears or lugs projecting to one side, said lugs serving to form air-passages when the links are put together to form the armature. The links lie side by side with paper between them, and through a hole, H, in the center of each pass rods C, provided with heads D on corresponding ends, and on their opposite ends with screw-threads which screw into female screws in the farthest or last link measured from that against which abut the heads of the rods. The said links containing a screw-thread are those shown in the extreme right in Figs. 1 and 3. The method in which this armature is wound is not shown, as my invention relates only to the construction of the frame-work of the armature.

From the description it may be observed that the construction differs from any heretofore made in two or three particulars, the principal of which is more clearly shown in Fig. 3. The links of each section are all held together by one rod passing through the center and screwing into the last link, whereby the said links are held rigidly in the direction of the said rod. These links thus held together form a section of the armature, and each section is seen to contain four longitudinal grooves, $a$ and $a'$ and $b$ and $b'$, which are adapted to contain wire, as in ordinary bobbins. Upon the rods C fit the ends of the links, each of which is shaped with a semicircular groove. The rods C thus serve not only to hold together rigidly the disks B and B', but also to keep the sections in their proper position in a direction at right angles to the shaft.

The construction, as described, forms a simple, cheap, and effective armature adapted to be applied in a large class of dynamo-electric generators.

Having described my invention, what I desire to obtain by Letters Patent is—

1. In combination with the shaft of an armature of a dynamo-electric generator, two disks, B and B', fixed upon said shaft, links F, shaped as shown, and provided each with a hole, $h$, at or near the center, and with grooves at the two ends, rods C', provided with the heads D on one end and screw-threads upon the other, passing through the said holes $h$ and screwed into a female screw contained in the farthest link from the head D, and rods C, connecting the two disks B and B', and each fitting into the grooves at the ends of every link, substantially as described.

2. A section of an armature of a dynamo-electric generator, consisting of links E, provided with holes $h$ at their centers and rods C', passing through said holes and adapted to retain the links in a definite position, substantially as described.

3. In combination with links E of a section of an armature of a dynamo-electric generator, a rod, C', provided with the head D upon one end and a screw-thread upon the other end, said rod passing through holes *h* in said links and screwing into a female screw contained in the link farthest from the head D, substantially as described.

4. An armature-section consisting of links fastened together side by side by means of a rod passing through holes at or near the center of each, substantially as described.

5. An armature-section composed of links which contain a hole at the center, said hole being adapted to receive a rod, and grooves at the two ends, said grooves being adapted to fit upon a second rod parallel to the first, substantially as and for the purpose specified.

6. An armature-section, provided with grooves *a* and *a'* and *b* and *b'*, and consisting of links, shaped as shown, and connected side by side by means of a rod passing through a hole perforated in each link, substantially as and for the purpose specified.

7. In combination with an armature-section composed of links held together by a rod passing through their centers, grooves D at each end of each link, said grooves being adapted to receive a rod which connects the two disks B and B', fixed upon the shaft of the armature, substantially as described.

8. In combination with links held together by a rod passing through their centers, an insulating paper, F, inserted between said links, substantially as described.

9. In combination with the two disks B and B', fixed upon the shaft of an armature, rods C, connecting the said disks, and each rod fitting into two grooves, each of said grooves belonging to adjacent sections of said armature, substantially as described.

10. In an armature, links each provided with small lateral projections, substantially as shown and described, and for the purpose specified.

11. In an armature, links each having a hole at or near the center, a semicircular groove at each end, and lugs or ears upon one side, substantially as described and shown.

In testimony that I claim the foregoing as my invention I have signed my name in presence of two witnesses, this 24th day of March, 1885.

ALEXANDER H. BOWMAN.

Witnesses:
    EDWARD E. FEUSTERMACHER,
    JNO. S. LENTZ.